May 7, 1963 M. LINCOLN Re. 25,378

SPIKE-GRIP FOR INTERCHANGEABLE FUR COLLARS

Original Filed May 1, 1958 2 Sheets-Sheet 1

INVENTOR.
MURRAY LINCOLN
BY
Zoltan P. Polachek
ATTORNEY

SPIKE-GRIP FOR INTERCHANGEABLE FUR COLLARS

Original Filed May 1, 1958 2 Sheets-Sheet 2

INVENTOR.
MURRAY LINCOLN
BY Zoltan A. Polachek
ATTORNEY

United States Patent Office

Re. 25,378
Reissued May 7, 1963

25,378

SPIKE-GRIP FOR INTERCHANGEABLE FUR COLLARS

Murray Lincoln, 9 Hutchinson Ave., Scarsdale, N.Y.

Original No. 2,882,530, dated Apr. 21, 1959, Ser. No. 732,269, May 1, 1958. Application for reissue Apr. 19, 1961, Ser. No. 104,190
1 Claim. (Cl. 2—98)

Matter enclosed in heavy brackets [ ] appears in the original patent but forms no part of this reissue specification; matter printed in italics indicates the additions made by reissue.

This invention relates generally to fur collars, of the type adapted to be removably attached to a garment such as a cloth coat.

An important object of the present invention is to provide a fur collar of the type described that will have an improved fastening means, so designed as to permit it to be connected to and detached from an associated garment swiftly and easily.

Another object is to provide a fur collar as described which will be so designed that the fastener means will be completely concealed from view when the collar is in use.

Yet another object is to so form the collar that the fastener means will be disposed to connect the collar to the garment at a plurality of locations longitudinally of the collar.

Still another object of importance is to provide a fur collar of the character described which will include means for connecting the same to various garments, without requiring the provision of cooperating fastening elements on the garments themselves.

Still another object of importance is to provide a fur collar of the character described that will have a fastening means so designed as to be capable of manufacture at a comparatively low cost, considering the benefits to be obtained from the use thereof.

Another object, in at least one form of the invention, is to provide a fur collar the fastener means of which will have a novel, coactive relationship to the collar and to a garment with which the collar is used, with the construction nevertheless being designed for employing fastener means which are conventional per se, thus to permit the collar to be manufactured entirely or almost wholly from elements that are available on the open market.

*The primary object of my invention is to provide a quick attachable collar cover for coats, such as men and women's overcoats, where both the collar and the cover therefore have plain opposing wall surfaces and only one of which carries an attaching means, such as on the plain wall surface of the cover, for directly impaling the plain wall surface of the coat collar thereon.*

*A still further object of my invention in such a quick attachable cover for coat collars where each has a plain wall surface opposing the other, is a tack or spike-type fastener having a head secured on one of said wall surfaces to extend normal thereto and through the other wall surface for directly impaling one wall surface upon the other.*

*Other objects of my said quick attachable cover for coat collars and the like include the provision of an additional protective means also impaled upon said tack or spike-type fastening means beyond the other of said wall surface in the form of a sheath-type loss preventing device.*

*Still another object of my invention in a quick attachable cover for coat collars as set forth herein provides straight line opposed, attaching and holding of the plain opposed wall surface of a coat collar and a cover by cooperating impaling means without damage to either and*

*wherein the opposed relationship of said wall surfaces is made variable and adjustable on said cooperating straight line holding and attaching means in transfixing one to the other.*

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figure 1:
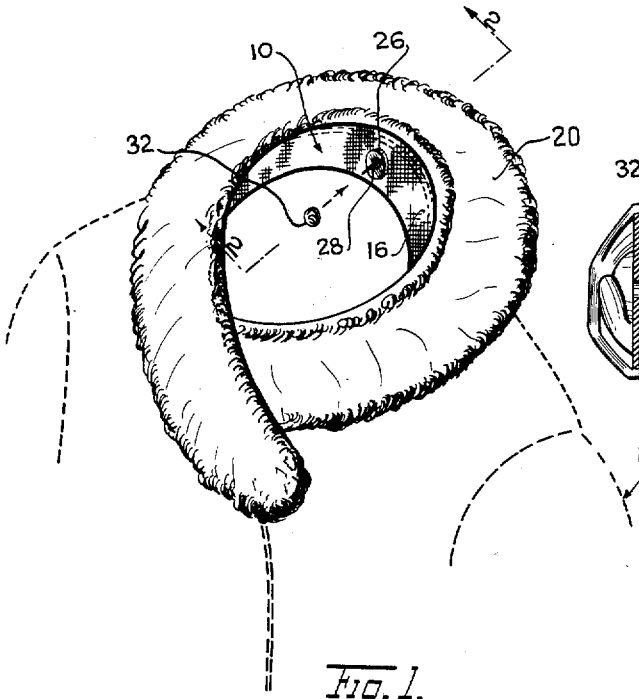
FIG. 1 is a perspective view of a removable fur collar according to the present invention, a coat on which the collar is disposed being illustrated fragmentarily and in dotted lines.
Figure 2:
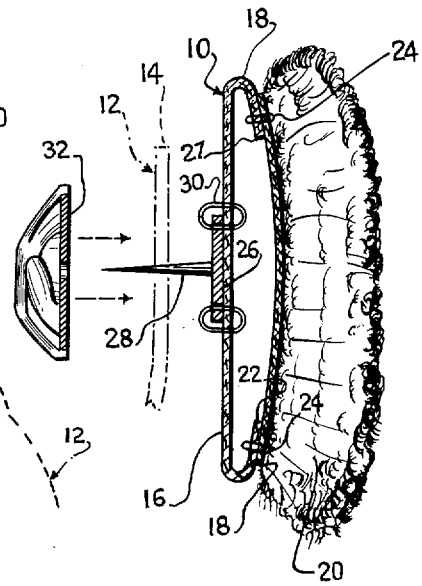
FIG. 2 is an enlarged transverse sectional view, exploded, substantially on line 2—2 of FIG. 1.
Figure 3:
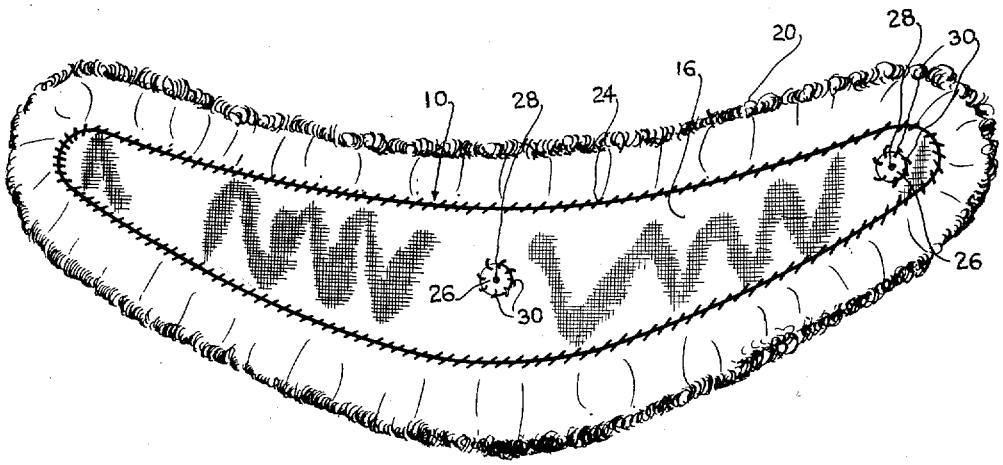
FIG. 3 is an elevational view of a collar, on a scale between that of FIGS. 1 and 2, showing the inner side of the collar.

In the form of the invention shown in FIGS. 1–3, the fur collar attachment comprising the present invention has been generally designated at 10 and includes means to detachably connect the same to the cloth collar of a coat 12. The fur collar can be attached to any coat, in a manner to be described hereinafter, without the necessity of especially preparing the coat to receive the collar, as for example by sewing on buttons, etc.

The coat includes a cloth collar 14, while the removable fur collar 10 has an inner panel 16 of elongated formation, the lower longitudinal edge of which is bowed downwardly while the upper edge is bowed inwardly as best shown in FIG. 3. Panel 16 has its top and bottom edge portions bent inwardly in back of the body portion of the panel, as at 18. The fur 20 is applied to the panel, being stitched at the locations 22 to the portions 18 by means of stitching 24, thereby leaving a space between the panel 16 and the fur 20 constituting a pocket.

In accordance with the present invention, a pair of spike-type separable fasteners are secured to the panel 16, facing toward the coat collar 14. One of said fasteners is disposed medially between the ends of the fur collar 10 while the other is disposed adjacent one extremity thereof. The fasteners are identical and can be purchased on the open market. Each includes a flat, circular, thin base 26 from which forwardly projects a sharp spike or pin 28. Openings are spaced about the margin of the base 26, and stitching 30 is extended through said openings. A retaining button 32 is also conventional, and mates with the fastener element 26.

In applying the fur collar to the coat, one simply extends the spikes or pins 28 through the cloth collar 14 of the coat, as in FIG. 2, after which the button is applied to hold the fur collar assembled with the coat. As will be noted, the fur collar is attached to the coat at two locations, with one end of the collar being free so as to be loosely disposed across the front of the coat. This is preferred so that one may, in effect, have a wrap-around collar and be free to loosely cross the free end portion of the collar with the other end portion.

If desired, of course, fasteners could be provided at both ends rather than at one end of the fur collar.

*In the foregoing I have specifically defined my invention in respect to a plain backed or lining supported hide side of a fur piece, the lining being of substantially the same extent as the fur piece with the edges of the lining*

*folded upon itself and secured inwardly of the edges of said hide so as to extend outwardly therefrom and provide a support therefor. Then to complete this unitary quick and safe attachable fur collar piece as an article of manufacture, I have provided a plurality of spaced sharp pointed spike-type impaling members fixedly mounted on said lining to extend normal thereto with combined spike point sheathing members and fur piece and cloth collar connecting means whereby with a plurality of safe and positive connecting means only on the quick attachable fur piece lining, said fur piece may be readily and easily handled and connected to and supported by the cloth collar of any coat at will.*

Figure 4:
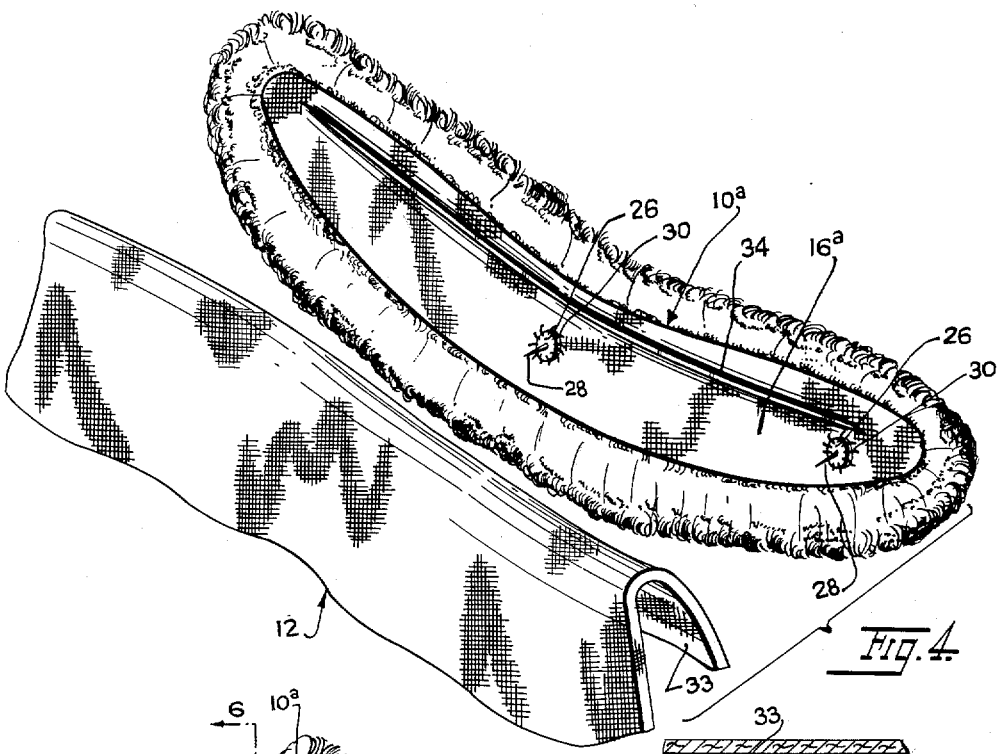
FIG. 4 is an enlarged, exploded perspective view showing a modified form of the collar and illustrating, fragmentarily, a coat to which the collar is applied.
Figure 5:
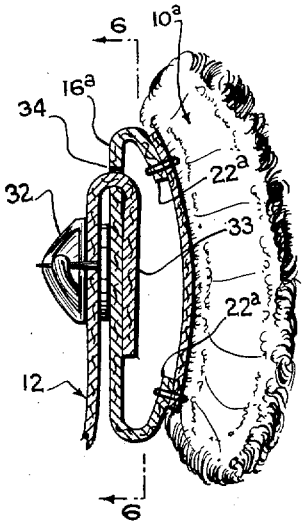
FIG. 5 is a view like FIG. 2 showing the modified form applied to the collar.
Figure 6:
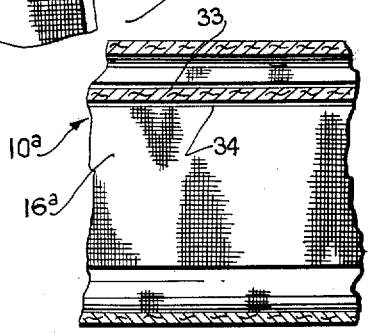
FIG. 6 is a section on line 6—6 of FIG. 5.

In FIGS. 4–6, there is shown a modified form of fur collar 10[a]. This is applied to the cloth collar 12, which in this form of the invention is shown as having a turn-down collar 33.

Fur collar 10[a] is identical in every respect to the first form of the invention, except that it has a longitudinal slot 34 extending almost its full lentgh near its top edge.

In this form of the invention, the panel 16[a], which of course would be formed of an attractive fabric material such as satin, is secured at 22[a] to the fur or hide. The fastener elements are secured to the front surface of the panel 16[a] in the same manner as in the previous form of the invention.

In use of this form, one extends the turn-down portion 33 of the coat collar through the slot or opening 34, into the pocket between the panel 16[a] and the fur, and then extends the spikes of the fastener elements through the material of the coat collar, thereafter applying the caps 32. The result is that the turn-down portion remains engaged inside the pocket in the removable fur collar so that the removable fur collar appears to be a permanent portion of the cloth coat.

In both forms of the invention, of course, the removable collar has its fastening elements completely concealed when the collar is in use, and the coat to which the collar is removably attached need not be specially designed, or provided with special buttons or other fastener elements, etc. Still further, the removable fur collar can be rather inexpensively designed, and can be interchangeably used on a large number of different coats or similar garments.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

[1. In combination with a coat having a permanently attached turned-over collar, a fur collar removably attached to said coat collar, said fur collar comprising an elongated cloth panel, a fur covering for said panel attached along its edge to said panel, the remainder of the fur covering being unattached providing a recess between the panel and fur covering, said panel having an elongated slot adjacent the edge thereof communicating with said recess, a portion of said turned-over collar inserted in said slot and received in said recess, pointed fastening elements spaced along the panel projecting through the portion of the turned-over collar outside the panel, and cooperating socketed fastening elements detachably mounted on the pointed fastening elements outwardly of the turned-over collar.]

*2. A fur collar comprising an elongated fur piece adapted to completely cover the cloth collar of a coat, said fur piece having on its hide side a supporting lining of substantially the same extent as said fur piece, said lining having its edges folded upon itself and secured inwardly of the edges of said hide so as to provide a space between said lining and said hide, said folded edge portions of said lining extending outwardly of the edges of said hide and providing a support for said fur piece, a plurality of sharp pointed spike-type impaling members fixedly mounted in longitudinally spaced relation on said lining to extend normal thereto, a combined spike point sheathing member and fur piece and cloth collar connecting means frictionally engaging over the body of each spike-type member, and each said sheathing member having a planar base portion engageable with said cloth collar in opposed relation to said supporting lining of said fur piece.*

References Cited in the file of this patent or the original patent

UNITED STATES PATENTS

| | | |
|---|---|---|
| 731,837 | Ashmore | June 23, 1903 |
| 1,248,332 | Isenhour | Nov. 27, 1917 |
| 1,299,244 | Sherwin | Apr. 1, 1919 |
| 2,300,125 | Lapick | Oct. 27, 1942 |
| 2,308,412 | Ballou et al. | Jan. 12, 1943 |
| 2,617,106 | Pritzker | Nov. 11, 1952 |
| 2,692,386 | Cohen | Oct. 26, 1954 |
| 2,847,773 | Herrick | Aug. 19, 1958 |

FOREIGN PATENTS

| | | |
|---|---|---|
| 105,923 | Switzerland | July 16, 1924 |
| 827,037 | Germany | Jan. 7, 1952 |
| 894,086 | Germany | Oct. 22, 1953 |